(12) United States Patent
Chen

(10) Patent No.: US 11,807,140 B2
(45) Date of Patent: Nov. 7, 2023

(54) HEADREST SUPPORT STRUCTURE AND INFANT CARRIER THEREOF

(71) Applicant: BAMBINO PREZIOSO SWITZERLAND AG, Steinhausen (CH)

(72) Inventor: Yingzhong Chen, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/550,498

(22) Filed: Dec. 14, 2021

(65) Prior Publication Data

US 2022/0185155 A1    Jun. 16, 2022

(30) Foreign Application Priority Data

Dec. 15, 2020 (CN) .......................... 202023043348.9

(51) Int. Cl.
*B60N 2/28* (2006.01)

(52) U.S. Cl.
CPC ......... *B60N 2/2851* (2013.01); *B60N 2/2884* (2013.01)

(58) Field of Classification Search
CPC .... B60N 2/2851; B60N 2/888; B60N 2/2821; B60N 2/2824; B60N 2/2848; B60N 2/2884; B60N 2/2888
See application file for complete search history.

(56) References Cited

U.S. PATENT DOCUMENTS

| | | | | |
|---|---|---|---|---|
| 3,838,870 A | * | 10/1974 | Hug | B60N 2/838 297/216.12 |
| RE47,971 E | * | 5/2020 | Tanner | B60N 2/2821 |
| 2003/0151282 A1 | * | 8/2003 | Williams | B60N 2/815 297/410 |
| 2011/0309658 A1 | * | 12/2011 | Carimati Di Carimate | B60N 2/2821 297/378.12 |
| 2012/0223558 A1 | * | 9/2012 | Wang | B60N 2/2875 297/250.1 |
| 2012/0306243 A1 | | 12/2012 | Oltman | |
| 2013/0320725 A1 | * | 12/2013 | Conway | B60N 2/2851 297/256.11 |
| 2014/0132049 A1 | | 5/2014 | Brunick | |
| 2015/0035329 A1 | * | 2/2015 | Sparling | B60N 2/2851 297/216.13 |

(Continued)

FOREIGN PATENT DOCUMENTS

| | | |
|---|---|---|
| CN | 205601654 | 9/2016 |
| CN | 205970956 | 2/2017 |

(Continued)

*Primary Examiner* — David R Dunn
*Assistant Examiner* — Tania Abraham
(74) *Attorney, Agent, or Firm* — HAUPTMAN HAM, LLP

(57) ABSTRACT

A headrest support structure applied to a safety seat is disclosed. The headrest support structure includes a buffer mechanism. The buffer mechanism is connected to a headrest and a seat of the safety seat. Elastic deformation of the buffer mechanism provides a buffer to the headrest and the seat. The headrest support mechanism provided by an embodiment of the present application has a high safety factor and provides a buffer to the headrest and the seat during an emergency brake for accident prevention. The present application further provides an infant carrier having the headrest support structure.

20 Claims, 8 Drawing Sheets

(56) References Cited

U.S. PATENT DOCUMENTS

| | | | | |
|---|---|---|---|---|
| 2016/0039319 A1* | 2/2016 | Zhang | .................. | B60N 2/2887 |
| | | | | 297/216.11 |
| 2016/0304004 A1* | 10/2016 | Sandbothe | ............ | B60R 21/013 |
| 2020/0108757 A1* | 4/2020 | Mori | .................. | B60N 2/42709 |
| 2020/0223333 A1* | 7/2020 | Mason | ................. | B60N 2/2875 |
| 2020/0269733 A1* | 8/2020 | Heisey | ................ | B60N 2/2848 |
| 2021/0188143 A1* | 6/2021 | Pistilli | .................... | B60N 2/888 |

FOREIGN PATENT DOCUMENTS

| | | |
|---|---|---|
| CN | 110126688 | 8/2019 |
| DE | 10306341 B4 | 6/2012 |
| DE | 102012017746 B4 | 6/2016 |
| DE | 102019220261 A1 | 6/2021 |

* cited by examiner

HEADREST SUPPORT STRUCTURE AND INFANT CARRIER THEREOF

BACKGROUND OF THE INVENTION

1. Field of the Invention

The present application relates to a headrest support structure and an infant carrier, and more specifically, to a headrest support structure having a high safety factor and providing a buffer to a headrest and a seat and an infant carrier having the headrest support structure.

2. Description of the Related Art

An infant carrier has been widely used in families with infants. Various kinds of infant carriers provide convenience in carrying an infant. At the same time, user demands for functionality and safety of an infant carrier are increasing. A safety seat and a stroller provide much convenience to outdoor activities of infants. In general, a headrest of the safety seat (or the stroller) adopts a height adjustable design for infants at different ages.

However, during an emergency brake, a headrest and a seat of a safety seat (or a stroller) may squeeze each other easily due to inertia of motion to cause deformation of the headrest. The deformed headrest could squeeze an infant sitting on the safety seat such that the infant may be impacted during the emergency brake.

SUMMARY OF THE INVENTION

One purpose of at least one embodiment of the present application is to provide a headrest support structure having a high safety factor and providing a buffer to a headrest and a seat.

Another purpose of at least one embodiment of the present application is to provide an infant carrier with a headrest support structure having a high safety factor and providing a buffer to a headrest and a seat.

For achieving the aforesaid purposes, at least one embodiment of the present application provides a headrest support structure applied to a safety seat. The safety seat has a headrest and a seat. The headrest support structure includes a buffer mechanism connected to the headrest and the seat. Elastic deformation of the buffer mechanism provides a buffer to the headrest and the seat.

In at least one embodiment the buffer mechanism includes a reinforcement tube, and the reinforcement tube is fixedly attached to the headrest.

In at least one embodiment the reinforcement tube is fixed to the headrest along a longitudinal direction.

In at least one embodiment the reinforcement tube includes a fixing hole formed thereon for allowing a rivet to pass therethrough, and the reinforcement tube is fixedly attached to the headrest via the rivet.

In at least one embodiment the buffer mechanism further includes a pad. The pad is an elastic structure disposed on the seat and disposed opposite to the reinforcement tube, and the pad is squeezed elastically by the reinforcement tube to provide a buffer to the headrest.

In at least one embodiment the pad is made of expandable polystyrene (EPS) material.

In at least one embodiment the headrest mechanism further includes an adjustment mechanism. The headrest is slidably connected to the seat. The adjustment mechanism is disposed on the headrest, and the adjustment mechanism is engaged with the seat in multiple stages along a height direction of the headrest.

In at least one embodiment the adjustment mechanism includes a locking member telescopically disposed on the headrest. The locking member is engaged with the seat when the locking member extends outside the headrest, and the locking member is disengaged from the seat for releasing the headrest when the locking member retracts back into the headrest.

In at least one embodiment at least two locking holes are formed on the seat at different heights in a longitudinal direction, and a height of the headrest relative to the seat is adjusted by engagement of the locking member with any of the locking holes.

In at least one embodiment the adjustment mechanism further includes a linkage member. The linkage member is disposed on the headrest and linked with the locking member.

In at least one embodiment the adjustment mechanism further includes an elastic member disposed on the headrest, and the elastic member is in contact with the locking member.

In at least one embodiment the adjustment mechanism further includes an adjustment rod. The locking member is slidably disposed on the adjustment rod, and the elastic member is between the adjustment rod and the locking member.

In at least one embodiment the linkage member is a rope-shaped structure. One end of the linkage member is fixed to the headrest, and another end of the linkage member is connected to the locking member.

In at least one embodiment a through hole is formed on the adjustment rod, and the linkage rod extends into the adjustment rod via the through hole to be connected to the locking member.

In at least one embodiment the headrest has a fixing block disposed thereon for fixing the adjustment rod.

Correspondingly, at least one embodiment of the present application further provides an infant carrier applied to a carrier body mounted on a movable carrier. The infant carrier includes a seat, a headrest, a base, and a headrest support structure. The headrest is slidably connected to the seat. The base is connected to the seat and detachably connected to the carrier body. The headrest support structure includes a buffer mechanism connected to the headrest and the seat. Elastic deformation of the buffer mechanism provides a buffer to the headrest and the seat.

In at least one embodiment the carrier body is a car seat.

In at least one embodiment the seat is detachably connected to the base. The base has a first connection member disposed thereon, the car seat has a second connection member disposed thereon, and the base is fixed on the car seat via the first connection member and the second connection member.

In at least one embodiment the carrier body is a handle frame of a stroller.

In at least one embodiment the seat has a third connection member disposed thereon, the handle frame has a fourth connection member disposed thereon, and the seat is fixed to the handle frame via the third connection member and the fourth connection member.

Compared with the prior art, the safety seat of the infant carrier of an embodiment of the present application can be mounted on the carrier body of the movable carrier. The safety seat has the base and the headrest support structure disposed thereon. The headrest is slidably connected to the seat, and the seat is connected to the base. When the safety seat is utilized on the car, the base can be connected to the car seat for fixing the safety seat on the car seat. When the safety seat is utilized on the stroller, the base can be detached from the safety seat and then the seat can be directly fixed on the handle frame of the stroller for fixing the safety seat on the stroller. The height of the headrest relative to the seat can be adjustable for achieving the purpose that the headrest can be adjusted upward and downward relative to the seat according to different heights of infants at different ages, so that the headrest can provide a comfortable support to an infant's head when the infant is sitting on the safety seat. The buffer mechanism of the headrest support structure is connected to the headrest and the seat for preventing the headrest from being in contact with the seat directly. When the infant carrier having the safety seat mounted thereon is in an emergency brake or receives a sudden impact, elastic deformation of the buffer mechanism can provide a buffer to the headrest and the seat when the headrest and the seat squeeze each other due to inertia of motion, so as to avoid deformation of the headrest and efficiently prevent the infant from getting hurt when the headrest and the seat squeeze each other. In such a manner, at least one embodiment of the present application can efficiently solve the infant safety problem caused by deformation of the headrest for improving the safety factor of the safety seat.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
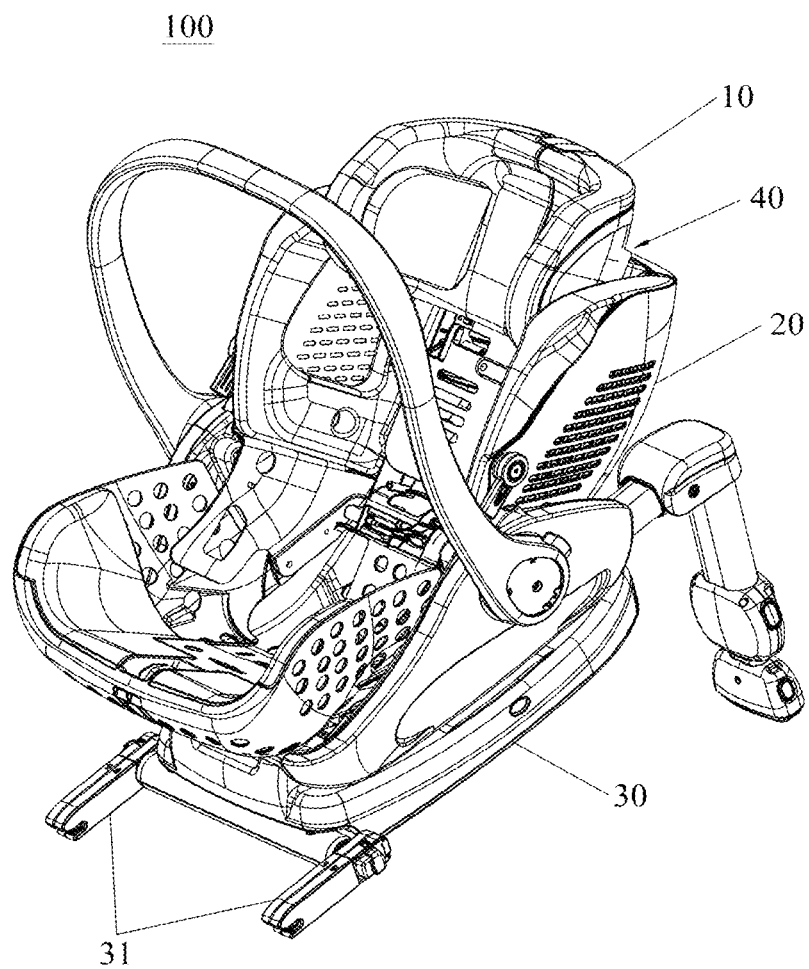
FIG. 1 is a diagram of a safety seat of an embodiment of the present application.

The detailed description for preferred embodiments of the present application is provided with attached drawings as follows. Similar reference numerals in the figures represent similar components.

Figure 7:
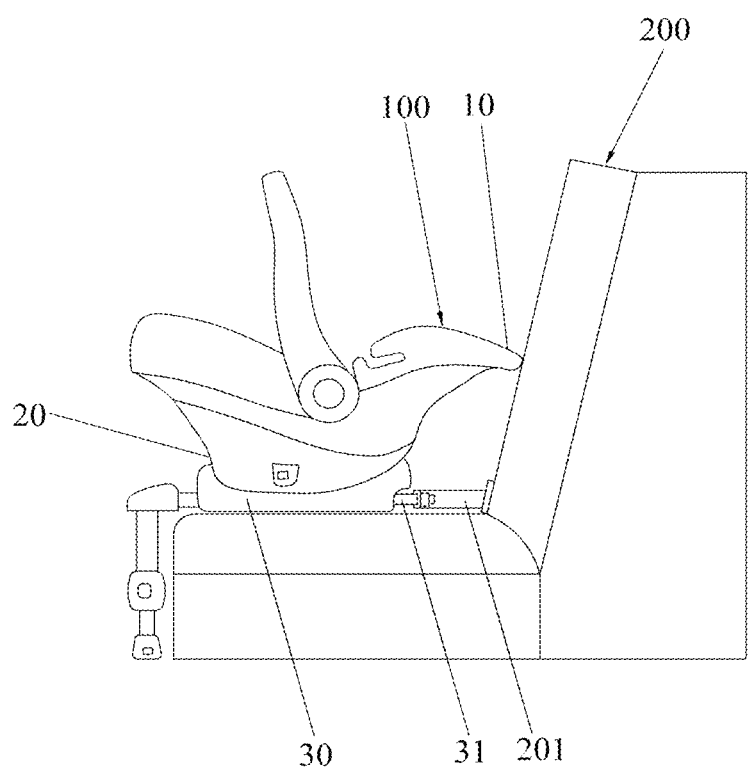
FIG. 7 is a diagram of the safety seat of an embodiment of the present application being mounted on a car seat of a car.
Figure 8:
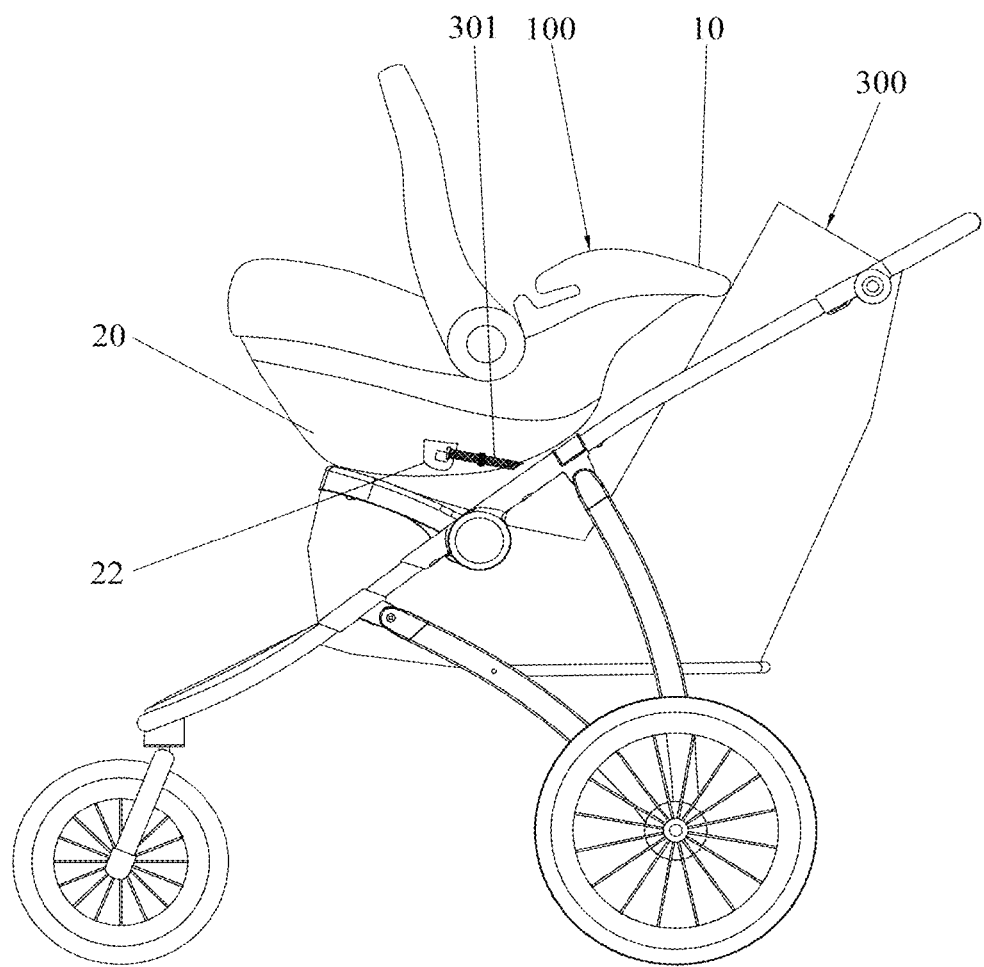
FIG. 8 is a diagram of the safety seat of an embodiment of the present application being mounted on a handle frame of a stroller.

Please refer to FIG. 1, FIG. 7, and FIG. 8 of an embodiment of the present application. A headrest support structure provided by this embodiment is applied to a safety seat 100, and the safety seat 100 is suitable for a carrier body mounted on a movable infant carrier. The carrier body could be a car seat 200 of a car or a handle frame 300 of a stroller. Of course, the infant carrier could be an other carrier suitable for assembling with the safety seat 100. The safety seat 100 could be mounted on different carrier bodies according to different applications for improving practicability of the safety seat 100 having the headrest support structure of the present application. The safety seat 100 includes a headrest 10, a seat 20, a base 30, and the headrest support structure. The headrest 10 is slidably connected to the seat 10. Slidable adjustment of the headrest 10 could be achieved by disposing slots, rails, or pulleys between the headrest 10 and the seat 20, so as to make the headrest 10 slidable upward and downward relative to the seat 20. The present application does not limit the slidable connection design of the headrest 10 and the seat 20. A height of the headrest 10 relative to the seat 20 can be adjustable for achieving the purpose that the headrest 10 can be adjusted upward and downward relative to the seat 20 according to different heights of infants at different ages, so that the headrest 10 can provide a comfortable support to an infant's head. The headrest support structure in this embodiment is connected to the headrest 10 and the seat 20 for providing a buffer to the headrest 10 when the car or the stroller having the safety seat 100 mounted thereon brakes sharply or receives a sudden impact to make the headrest 10 and the seat 20 squeeze each other and cause deformation of the headrest 10. As such, an embodiment of the present application can efficiently prevent the infant sitting on the safety seat 100 from being impacted due to deformation of the headrest 10, so as to improve the safety factor of the safety seat 100 and ensure safety of the infant.

More detailed description for the headrest support structure of the safety seat 100 in this embodiment is provided as follows.

Figure 2:
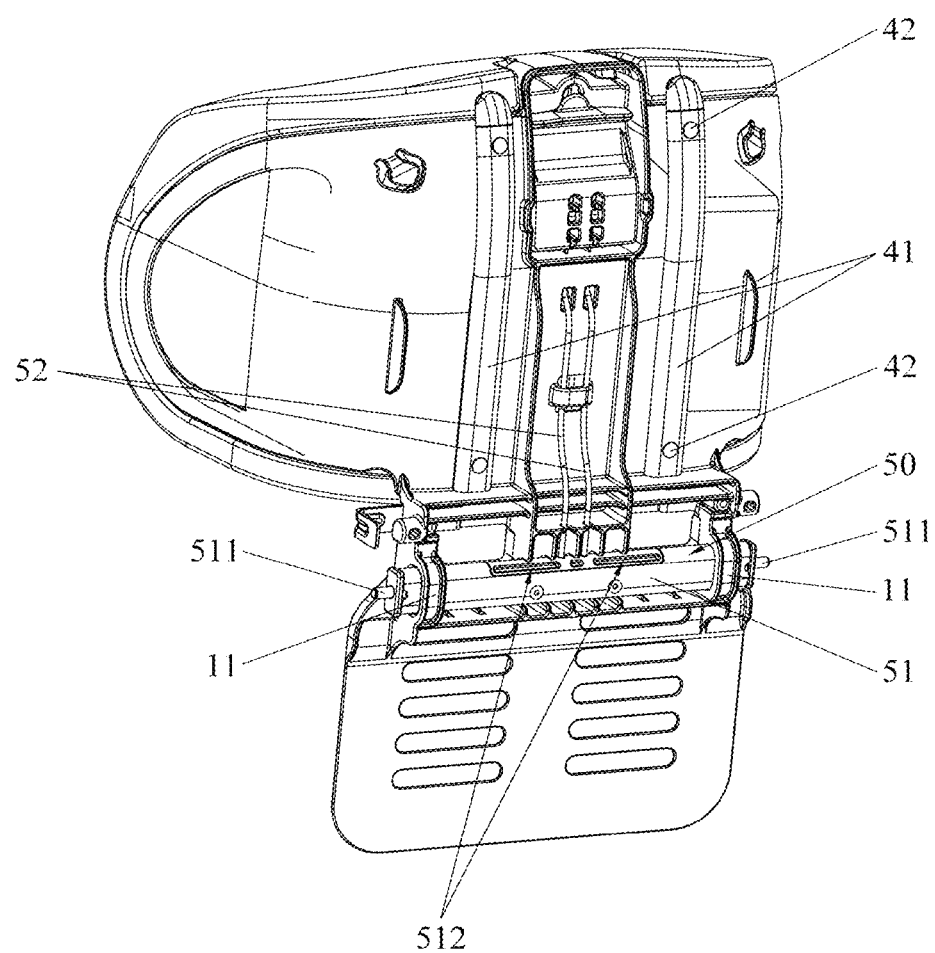
FIG. 2 is a diagram of a headrest of an embodiment of the present application.
Figure 3:
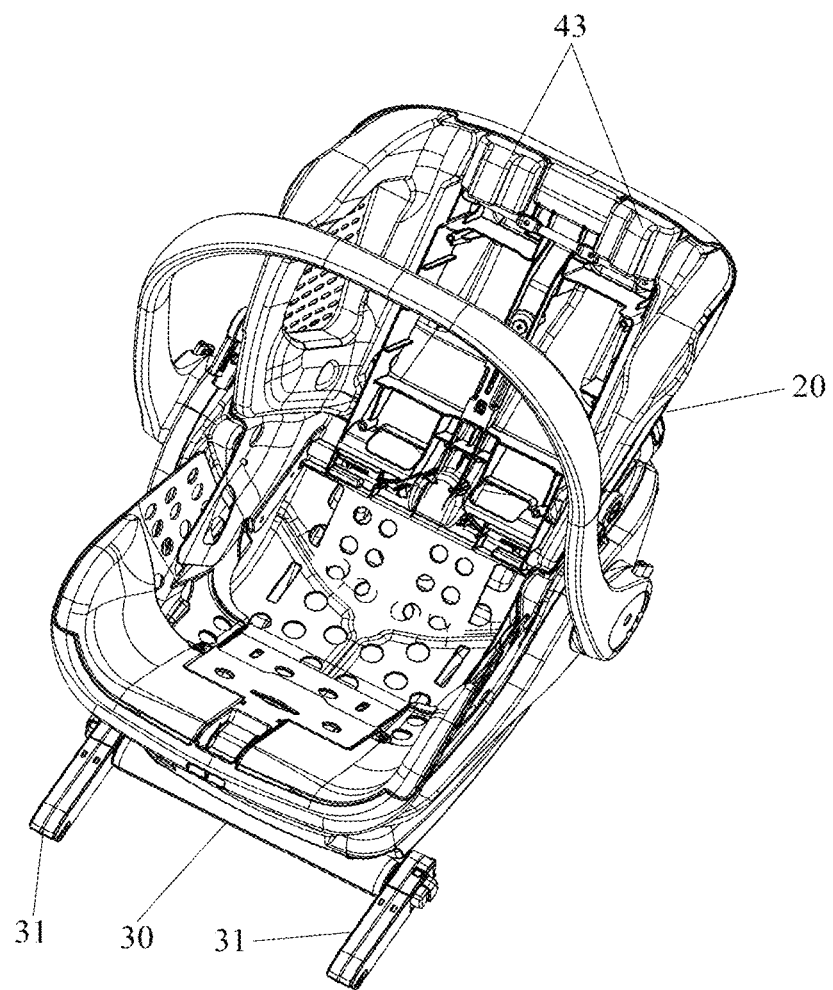
FIG. 3 is a diagram of the safety seat of an embodiment of the present application after the headrest is detached.

Please refer to FIGS. 1-3. The headrest support structure in this embodiment includes a buffer mechanism 40. The buffer mechanism 40 is connected to the headrest 10 and the seat 20. Elastic deformation of the buffer mechanism 40 provides a buffer to the headrest 10 and the seat 20. Since the buffer mechanism 40 is disposed between the headrest 10 and the seat 20, the buffer mechanism 40 can prevent the headrest 10 from being directly in contact with the seat 20. When the car or the stroller having the safety seat 100 mounted thereon brakes sharply or receives a sudden impact, elastic deformation of the buffer mechanism 40 occurs due to squeeze of the headrest 10 and the seat 20, so as to provide a buffer to the headrest 10 and the seat 20 for preventing the headrest 10 and the seat 20 from being damaged during the aforesaid squeezing process. As such, an embodiment of the present application can efficiently prevent the infant's head from getting hurt by deformation of the headrest 10. The buffer mechanism 40 includes a reinforcement tube 41. The reinforcement tube 41 is fixedly attached to the headrest 10 for increasing a contact area between the reinforcement tube 41 and the headrest 10 to improve the structural hardness of the headrest 10. In at least one embodiment, the reinforcement tube 41 could be made of metal material, such as light metal with high hardness (e.g., stainless steel or aluminum alloy), so as to ensure that the reinforcement tube 41 can bear an impact from the headrest 10 and the seat 20 during an emergency brake or a sudden impact. Of course, the reinforcement tube 41 could be made of plastic material with high hardness for reducing the weight of the safety seat 100. Specifically, the reinforcement tube 41 could be fixed to a back of the headrest 10 along a longitudinal direction. Since there is no support along the longitudinal direction on the headrest 10, deformation of the headrest 10 along the longitudinal direction occurs easily when the car or the stroller brakes sharply or receives a sudden impact. Thus, attaching the reinforcement tube 41 to the back of the headrest 10 along the longitudinal direction can provide a longitudinal support to the headrest 10 via the reinforcement tube 41 for efficiently enhancing the longitudinal strength of the headrest 10. In such a manner, when the car or the stroller brakes sharply or receives a sudden impact, the headrest 10 does not deform easily along the longitudinal direction, so as to prevent damage of the headrest 10 and avoid accidents caused by deformation of the headrest 10. Further, the reinforcement tube 41 could extend from an upper side of the headrest 10 toward a bottom side of the headrest 10 along the back of the headrest 10, so as to increase the contact area between the reinforcement tube 41 and the headrest 10 for enhancing the longitudinal hardness of the headrest 10. The reinforcement tube 41 could include a fixing hole for allowing a rivet 42 to pass therethrough, so that the reinforcement tube 41 could be fixedly attached to the back of the headrest 10 via the rivet 42. Accordingly, connection of the rivet 42 could make the reinforcement tube 41 and the headrest 10 connected to each other more firmly, so as to prevent the reinforcement tube 41 from falling out of the headrest 10 due to shake. Of course, the reinforcement tube 41 could also be fixed to the headrest 10 by welding, structural engagement or screws, but the present application is not limited thereto.

In at least this embodiment, two reinforcement tubes 41 are disposed on the back of the headrest 10. Specifically, the two reinforcement tubes 41 are longitudinally disposed close to a middle portion of the back of the headrest 10 and are arranged in parallel with each other. In general, the infant's head is close to the middle portion of the headrest 10 when the infant is sitting on the safety seat 100. Thus, the aforesaid design can minimize or prevent the infant's head from getting hurt since the hardness of the middle portion can be enhanced by the two reinforcement tubes 41. The aforesaid parallel arrangement of the two reinforcement tubes 41 not only can guide the infant's head to lean between the two reinforcement tubes 41 on the back of the headrest 10, but also can enhance the hardness and anti-deformation coefficient of the headrest 10. Of course, there could be only one reinforcement tube 41 or three (or four) reinforcement tubes 41 longitudinally disposed on the back of the headrest 10 for enhancing the hardness of the headrest 10 according to different application demands, but the present application is not limited thereto.

Please refer to FIG. 2 and FIG. 3. The buffer mechanism 40 in this embodiment could further include a pad 43 which is an elastic structure. The pad 43 is disposed on the seat 20 and disposed opposite to the reinforcement tube 41. The pad 43 can be squeezed elastically by the reinforcement tube 41 to provide a buffer to the headrest 10 when the headrest 10 receives an impact. Since the pad 43 is disposed opposite to the reinforcement tube 41, the reinforcement tube 41 can collide with the pad 43 first when receiving an impact after the height of the headrest 10 relative to the seat 20 is adjusted. As such, elastic deformation of the pad 43 can provide a buffer to the headrest 10 and the seat 20. In at least one embodiment, there could be a plurality of pads 43 disposed on the seat 20. Each pad 43 corresponds to one reinforcement tube 41 for providing a buffer to each reinforcement tube 41. In at least one embodiment, the pad 43 could be made of expandable polystyrene material, which is an expandable thermoplastic structure for providing a shockproof function. When the safety seat 100 is in an emergency brake or receives a sudden impact, the pad 43 can provide a buffer to the headrest 10 and the seat 20 for efficiently preventing the headrest 10 and the seat 20 from squeezing each other. Furthermore, when the car or the stroller is moving on a bumpy road, the headrest 10 may collide with the seat 20. At this time, the pad 43 can efficiently absorb and reduce shock between the headrest 10 and the seat 20, so as to help the infant feel more comfortable when sitting on the safety seat 100.

Figure 4:
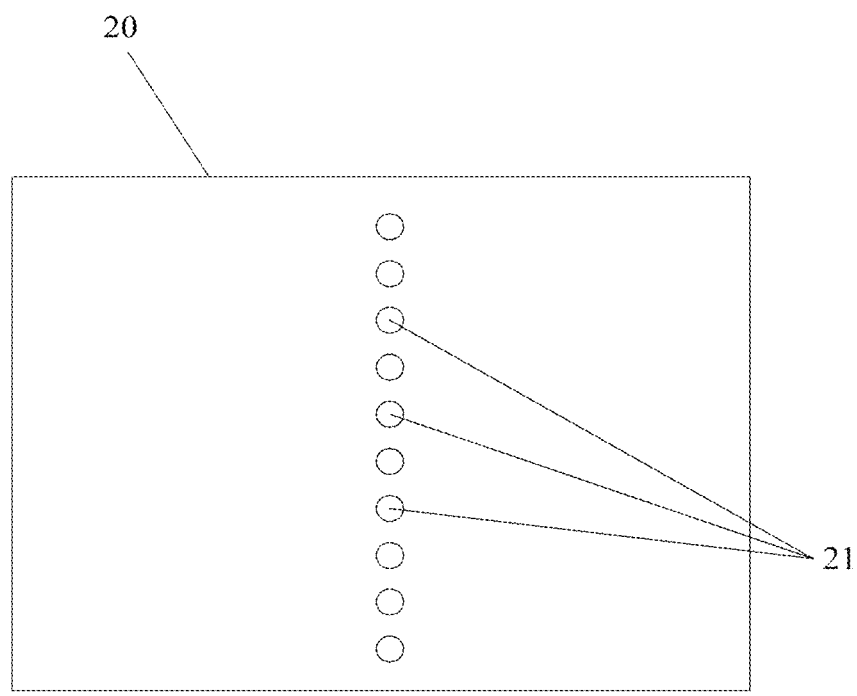
FIG. 4 is an arrangement diagram of locking holes on a seat of an embodiment of the present application.

Please refer to FIGS. 1-4. The headrest support structure in this embodiment could further include an adjustment mechanism 50. The headrest 10 is slidably connected to the seat 20, and the adjustment mechanism 50 is disposed on the headrest 10. The adjustment mechanism 50 is engaged with the seat 20 in multiple stages along a height direction of the headrest 10. After sliding the headrest 10 to an appropriate height on the seat 20, the adjustment mechanism 50 can be engaged with the seat 20 in a stage corresponding to the aforesaid height, so as to achieve the purpose that the safety seat 100 can be suitable for different infants at different ages via height adjustment of the headrest 10, for providing a comfortable support to the infant's head when the infant is sitting on the safety seat 100. The adjustment mechanism 50 includes a locking member 511, a linkage member 52, an elastic member, and an adjustment rod 51. The locking member 511 is telescopically disposed on the headrest 10. The locking member 511 is engaged with the seat 20 for locking the headrest 10 on the seat 20 when the locking member 511 extends outside the headrest 10, and the locking member 511 is disengaged from the seat 20 for releasing the headrest 10 from the seat 20 when the locking member 511 retracts back into the headrest 10. The seat 20 has at least two locking holes 21 formed thereon corresponding to the locking member 511 as shown in FIG. 4. The locking holes 21 are formed on the seat 20 at different heights in a longitudinal direction, and a height of the headrest 10 relative to the seat 20 can be adjusted by engagement of the locking member 511 with any of the locking holes 21. There could be ten locking holes 21 formed on the seat 20 in this embodiment. In practical application, there could be five, eight, twelve, fifteen or seventeen locking holes 21 formed on the seat 20 according to different application demands. Height adjustment precision of the headrest 10 relative to the seat 20 could be determined by the number of the locking hole 21, and the related description is omitted herein for simplicity.

The linkage member 52 is disposed on the headrest 10 and is linked with the locking member 511. The linkage member 52 is operable to make the locking member 511 engaged with or disengaged from the locking hole 21. The elastic member is disposed on the headrest 10 and is in contact with the locking member 511 to bias the locking member 511 toward the locking hole 21. The locking member 511 is slidably disposed on the adjustment rod 51, and the elastic member is between the adjustment rod 51 and the locking member 511.

In this embodiment, the adjustment rod 51 is horizontally disposed on the back of the headrest 10 for ensuring that two sides of the headrest 10 can be locked on the seat 20 in balance, so as to prevent the condition that the two sides of the headrest 10 are not located at the same height to cause poor locking of the headrest 10 on the seat 20. Two ends of the adjustment rod 51 in a length direction are elastically connected to the locking members 511. The locking member 511 extends outside the adjustment rod 51 along the length direction of the adjustment rod 51. The headrest 10 is locked on the seat 20 via the locking member 511. The aforesaid elastic member could be a spring for biasing the locking member 511 elastically, so as to keep the locking member 511 extending outside the adjustment rod 51 to make the headrest 10 and the seat 200 in a locked state.

Please refer to FIGS. 2-4. When the headrest 10 slides along the seat 20, the headrest 10 can be locked on the seat 20 at different heights by engaging the adjustment rod 51 with the locking holes at different heights for achieving height adjustment of the headrest 10. To be more specific, a fixing block 11 protrudes from the back of the headrest 10 for allowing the adjustment rod 51 to pass therethrough. Fixing the adjustment rod 51 through the fixing block 11 can prevent accidental movement of the adjustment rod 51 due to an external force, so as to avoid unexpected release of the headrest 10. To be noted, the height of the headrest 10 relative to the seat 20 could be adjusted along a vertical direction as shown in FIG. 4. Of course, a height adjustment path of the headrest 10 relative to the seat 20 could be arc-shaped in another embodiment, which means the height adjustment path of the headrest 10 depends on the connection relationship between the headrest 10 and the seat 20 and further determines arrangement of the locking holes 21.

More detailed description for the operation of the adjustment mechanism 50 is provided as follows.

Figure 5:
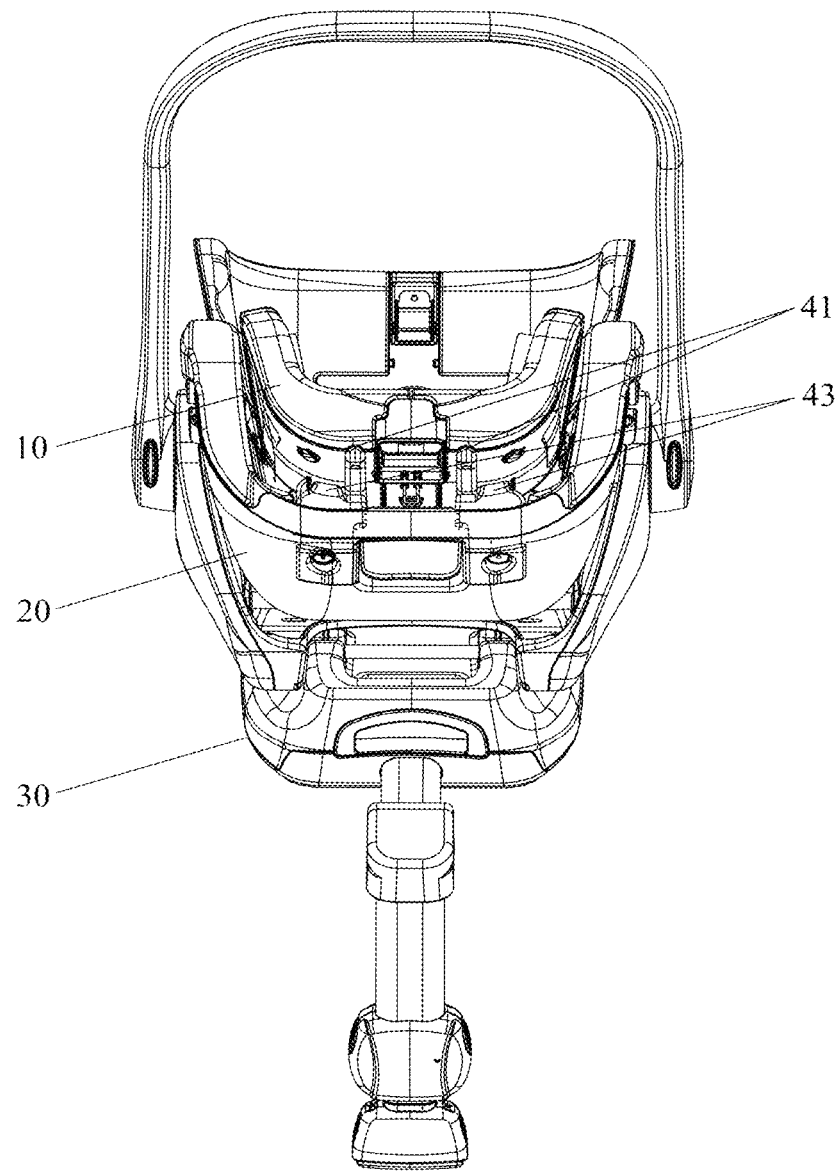
FIG. 5 is a diagram of the headrest of the safety seat of an embodiment of the present application after being adjusted upward relative to the seat.
Figure 6:
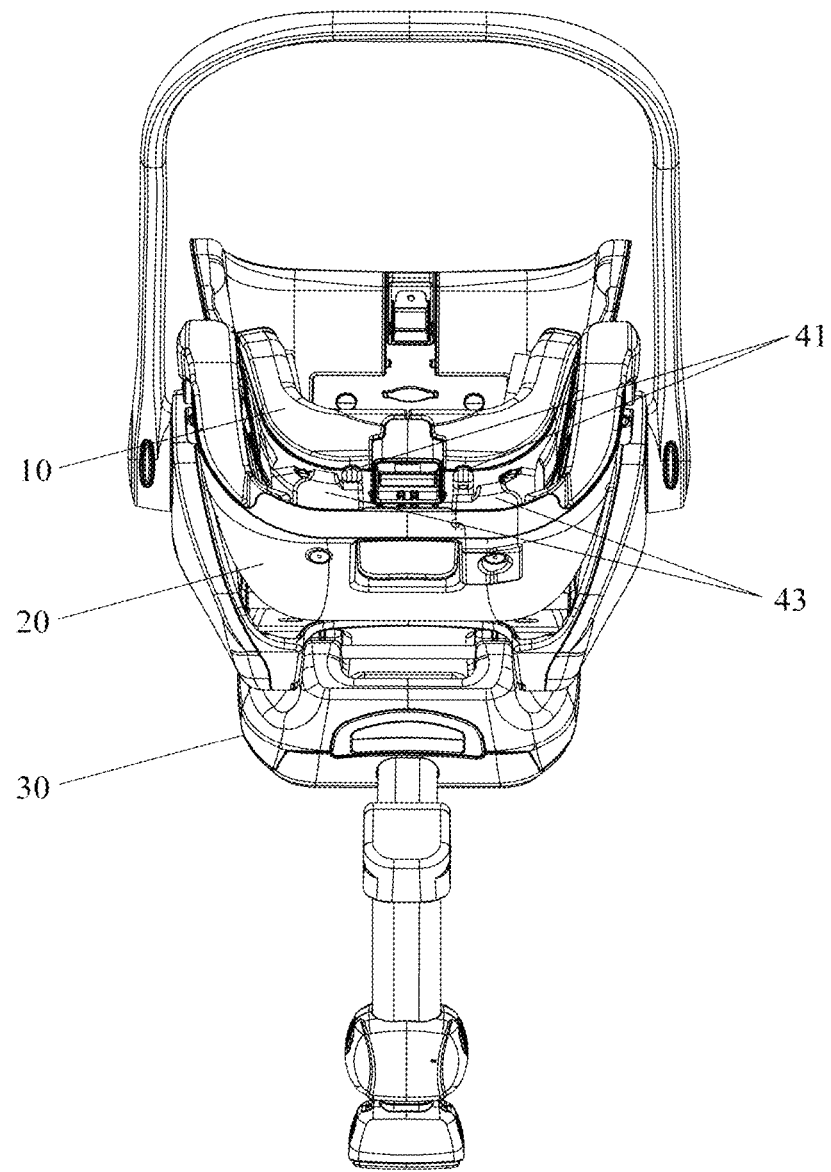
FIG. 6 is a diagram of the headrest of the safety seat of an embodiment of the present application after being adjusted downward relative to the seat.

Please refer to FIGS. 1-4. The linkage member 52 is connected to the locking member 511. The linkage member 52 is operated to drive the locking member 511 to retract back into the adjustment rod 51 along the length direction of the adjustment rod 51 for releasing the headrest 10 and the seat 20. Specifically, the linkage member 52 could be a rope-shaped structure. One end of the linkage member 52 is fixed on the headrest 10, and another end of the linkage member 52 is connected to the locking member 511. In at least some embodiments, the linkage member 52 could be a steel wire structure to be connected to the locking member 511 reliably for ensuring linkage between the linkage member 52 and the locking member 511. Specifically, the adjustment rod 51 has a through hole 512 formed at a middle position of a side wall of the adjustment rod 51. The linkage member 52 extends into the adjustment rod 51 via the through hole 512 to be connected to the locking member 511. An operating portion (not shown in the figures) is disposed on the headrest 10, and a free end of the linkage member 52 is connected to the operating portion. The aforesaid operating portion could be operated to retract the locking member 511 back into the adjustment rod 51 along the length direction via the linkage member 52 for releasing the headrest 10 and the seat 20. In this embodiment, the adjustment mechanism 50 could have two linkage members 52 disposed thereon. One end of the linkage member 52 is connected to the corresponding locking member 511, and another end of the linkage member 52 is connected to the operating portion on the safety seat 100. The operating portion could be operated to move the corresponding locking members 511 along the length direction of the adjustment rod 51 via the two linkage rods 52, respectively, to overcome the elastic force of the elastic member for retracting the corresponding locking members 511 back into the adjustment rod 51. As such, the locking member 511 can be disengaged from the corresponding locking hole 21 to allow that the headrest 10 can be slidable relative to the seat 20 for height adjustment. After the height of the headrest 10 relative to the seat 20 is adjusted, the operation portion could be released to make the locking member 511 extend outside the adjustment rod 51 along the length direction of the adjustment rod 51 via the elastic force of the elastic member to be engaged with the locking hole 21 corresponding to the height, so as to complete the height adjusting process of the headrest 10 on the seat 20. When the adjustment rod 51 is engaged with a higher locking hole 21, the headrest 10 is in a lifting state relative to the seat 20 as shown in FIG. 5. When the adjustment rod 51 is engaged with a lower locking hole 21, the headrest 10 is in a lowering state relative to the seat 20 as shown in FIG. 6. In such a manner, height adjustment of the headrest 10 can be suitable for different infants at different ages to provide a most comfortable headrest support.

Please refer to FIG. 1, FIG. 7, and FIG. 8. The related description for connection of the safety seat 100 and an infant carrier is provided as follows. Connection of the safety seat 100 and the car seat 200 is described first. As shown in FIG. 1 and FIG. 7, the seat 20 is detachably connected to the base 30, the base 30 has a first connection member 31 disposed thereon, and the car seat 200 has a second connection member 201 disposed thereon to be detachably connected to the first connection member 31. The base 30 can be fixed to the car seat 200 via the first connection member 31 and the second connection member 201. Subsequently, connection of the safety seat 100 and the handle frame 300 is described. As shown in FIG. 1 and FIG. 8, the base 20 has a third connection member 22, the handle frame 300 has a fourth connection member 301 disposed thereon to be detachably connected to the third connection member 22. The base 30 can be fixed to the handle frame 300 via the third connection member 22 and the fourth connection member 301. Finally, as shown in FIG. 1, FIG. 7, and FIG. 8, assembly and disassembly of the safety seat 100 and the infant carrier are described in the following. When the safety seat 100 is utilized in the car, the base 30 having the seat 20 mounted thereon can be fixed to the second connection member 201 of the car seat 200 via the first connection member 31 for fixing the safety seat 100 on the car seat 200. When the safety seat 100 is utilized on the stroller, the base 30 can be detached from the safety seat 100, and then the seat 20 of the safety seat 100 can be fixed on the handle frame 300 for fixing the safety seat 100 on the handle frame 300 of the stroller. To be noted, connection of the first connection member 31 and the second connection member 201 and connection of the third connection member 22 and the fourth connection member 301 can be achieved in a buckle or strip connection manner. Of course, connection of the first connection member 31 and the second connection member 201 and connection of the third connection member 22 and the fourth connection member 301 could also adopt other fixing design, such as a screwing locking design, but the present application is not limited thereto.

As shown in FIGS. 1-8, the safety seat 100 of the infant carrier of an embodiment of the present application can be mounted on the carrier body of the movable carrier. The safety seat 100 has the base 30 and the headrest support structure disposed thereon. The headrest 10 is slidably connected to the seat 20, and the seat 20 is connected to the base 30. When the safety seat 100 is utilized in the car, the base 30 can be connected to the car seat 200 for fixing the safety seat 100 on the car seat 200. When the safety seat 100 is utilized on the stroller, the base 30 can be detached from the safety seat 100 and then the seat 20 can be directly fixed on the handle frame 300 of the stroller for fixing the safety seat 100 on the stroller. The height of the headrest 10 relative to the seat 20 can be adjustable for achieving the purpose that the headrest 10 can be adjusted upward and downward relative to the seat 20 according to different heights of infants at different ages, so that the headrest 10 can provide a comfortable support to an infant's head when the infant is sitting on the safety seat 100. The buffer mechanism 40 of the headrest support structure is connected to the headrest 10 and the seat 20 for preventing the headrest 10 from being in contact with the seat 20 directly. When the infant carrier having the safety seat 100 mounted thereon is in an emergency brake or receives a sudden impact, elastic deformation of the buffer mechanism 40 can provide a buffer to the headrest 10 and the seat 20 when the headrest 10 and the seat 20 squeeze each other due to inertia of motion, so as to avoid deformation of the headrest 10 and efficiently minimize or prevent the infant from being impacted when the headrest 10 and the seat 20 squeeze each other. In such a manner, an embodiment of the present application can efficiently solve the infant safety problem caused by deformation of the headrest 10 for improving the safety factor of the safety seat 100. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A headrest support structure applied to a safety seat, the safety seat having a headrest and a seat, the headrest support structure comprising:
   a buffer mechanism connected to the headrest and the seat, elastic deformation of the buffer mechanism providing a buffer to the headrest and the seat,
   wherein
   the buffer mechanism comprises a reinforcement tube and a pad,
   the pad is an elastic structure disposed on the seat and disposed opposite to the reinforcement tube, and
   the pad is squeezed elastically by the reinforcement tube to provide a buffer to the headrest.

2. The headrest support structure of claim 1, wherein the reinforcement tube is fixedly attached to the headrest.

3. The headrest support structure of claim 2, wherein the reinforcement tube is fixed to the headrest along a longitudinal direction.

4. The headrest support structure of claim 3, wherein the reinforcement tube comprises a fixing hole formed thereon for allowing a rivet to pass therethrough, and the reinforcement tube is fixedly attached to the headrest via the rivet.

5. The headrest support structure of claim 1, wherein the pad is made of expandable polystyrene (EPS) material.

6. The headrest support structure of claim 1, further comprising an adjustment mechanism, wherein the headrest is slidably connected to the seat, the adjustment mechanism is disposed on the headrest, and the adjustment mechanism is engaged with the seat in multiple stages along a height direction of the headrest.

7. The headrest support structure of claim 6, wherein the adjustment mechanism comprises a locking member telescopically disposed on the headrest, the locking member is engaged with the seat when the locking member extends outside the headrest, and the locking member is disengaged from the seat for releasing the headrest when the locking member retracts back into the headrest.

8. The headrest support structure of claim 7, wherein at least two locking holes are formed on the seat at different heights in a longitudinal direction, and a height of the headrest relative to the seat is adjusted by engagement of the locking member with any of the locking holes.

9. The headrest support structure of claim 8, wherein the adjustment mechanism further comprises a linkage member, and the linkage member is disposed on the headrest and linked with the locking member.

10. The headrest support structure of claim 9, wherein the linkage member is a rope-shaped structure, one end of the linkage member is fixed to the headrest, and another end of the linkage member is connected to the locking member.

11. The headrest support structure of claim 10, wherein the adjustment mechanism further comprises an adjustment rod, a through hole is formed on the adjustment rod, and the linkage member extends into the adjustment rod via the through hole to be connected to the locking member.

12. The headrest support structure of claim 9, wherein the adjustment mechanism further comprises an adjustment rod, and the headrest has a fixing block disposed thereon for fixing the adjustment rod.

13. The headrest support structure of claim 8, wherein the adjustment mechanism further comprises an elastic member disposed on the headrest, and the elastic member is in contact with the locking member.

14. The headrest support structure of claim 13, wherein the adjustment mechanism further comprises an adjustment rod, the locking member is slidably disposed on the adjustment rod, and the elastic member is between the adjustment rod and the locking member.

15. An infant carrier applied to a carrier body mounted on a movable carrier, the infant carrier comprising:
   a seat;
   a headrest slidably connected to the seat;
   a base connected to the seat and detachably connected to the carrier body; and
   a headrest support structure comprising:
      a buffer mechanism connected to the headrest and the seat, elastic deformation of the buffer mechanism providing a buffer to the headrest and the seat,
   wherein
   the buffer mechanism comprises a reinforcement tube and a pad,
   the pad is an elastic structure disposed on the seat and disposed opposite to the reinforcement tube, and
   the pad is squeezed elastically by the reinforcement tube to provide a buffer to the headrest.

16. The infant carrier of claim 15, wherein the carrier body is a car seat.

17. The infant carrier of claim 16, wherein the seat is detachably connected to the base, the base has a first connection member disposed thereon, the car seat has a second connection member disposed thereon, and the base is fixed on the car seat via the first connection member and the second connection member.

18. The infant carrier of claim 15, wherein the carrier body is a handle frame of a stroller.

19. The infant carrier of claim 18, wherein the seat has a third connection member disposed thereon, the handle frame has a fourth connection member disposed thereon, and the seat is fixed to the handle frame via the third connection member and the fourth connection member.

20. A headrest support structure applied to a safety seat, the safety seat having a headrest and a seat, the headrest support structure comprising:
   a buffer mechanism connected to the headrest and the seat, elastic deformation of the buffer mechanism providing a buffer to the headrest and the seat,
   wherein
   the buffer mechanism comprises a reinforcement tube, and the reinforcement tube is fixedly attached to the headrest,
   the reinforcement tube is fixed to the headrest along a longitudinal direction, the reinforcement tube comprises a fixing hole formed thereon for allowing a rivet to pass therethrough, and the reinforcement tube is fixedly attached to the headrest via the rivet.

* * * * *